United States Patent [19]

Taghezout

[11] Patent Number: 5,302,875
[45] Date of Patent: Apr. 12, 1994

[54] ELECTROMAGNETIC MOTOR WITH TWO ROTATION SENSES PARTICULARLY INTENDED FOR A TIMEPIECE

[75] Inventor: Daho Taghezout, Lausanne, Switzerland

[73] Assignee: Eta SA Fabriques d'Ebauches, Granges, Switzerland

[21] Appl. No.: 872,703

[22] Filed: Apr. 17, 1992

[30] Foreign Application Priority Data

Apr. 19, 1991 [CH] Switzerland .............. 01169/91

[51] Int. Cl.$^5$ .................................................. H02K 21/12
[52] U.S. Cl. .................................. 310/156; 310/49 R; 310/162; 310/179; 310/254
[58] Field of Search ............... 310/156, 112, 42, 254, 310/49 R, 162, 163, 164, 256, 192, 184, 259, 179; 368/157, 180

[56] References Cited

U.S. PATENT DOCUMENTS

| | | | |
|---|---|---|---|
| 3,989,967 | 11/1976 | Kikuyama | 310/112 |
| 4,336,471 | 6/1982 | Plancon | 310/49 R |
| 4,546,278 | 10/1985 | Xuan | 310/49 R |
| 4,782,353 | 11/1988 | Ogihara | 310/49 R |
| 4,958,099 | 9/1990 | Chigira | 310/254 |
| 5,068,562 | 11/1991 | Tagami | 310/49 R |
| 5,130,594 | 7/1992 | Tagezout et al. | 310/156 |
| 5,132,578 | 7/1992 | Iwasa | 310/49 R |

FOREIGN PATENT DOCUMENTS

940059 12/1948 France .
2464516 3/1981 France .
10958 1/1986 Japan .

OTHER PUBLICATIONS

"Rotation by the Digits with permanent-magnet stepper motors", L. J. Chiarella, Machine Design, vol. 42, No. 29, Nov. 26, 1970.

*Primary Examiner*—R. Skudy
*Attorney, Agent, or Firm*—Weil, Gotshal & Manges

[57] ABSTRACT

This n-phased electromagnetic motor having two rotation senses and in which n is greater than 1, is particularly intended to drive the mechanism of a timepiece movement. It comprises n magnetic circuits, each being magnetically decoupled from n−1 other magnetic circuits. Each magnetic circuit includes two stator poles (4a and 4c, 4b and 4d) each comprising a polar expansion (6a to 6d respectively) partially defining a stator cavity (3) in which a rotor (2) is housed. These two stator poles are diametrally opposite one another relative to the axis (X—X) of the rotor (2). The magnetic separation of the magnetic circuits is assured by means of one or several gap(s) (15) judiciously arranged.

15 Claims, 9 Drawing Sheets

ELECTROMAGNETIC MOTOR WITH TWO ROTATION SENSES PARTICULARLY INTENDED FOR A TIMEPIECE

This invention concerns a low power electromagnetic motor having two rotation senses, adapted to function with an n-phased energization mode, wherein n is greater than 1.

More specifically, the invention concerns such an electromagnetic motor of small dimensions comprising a stator in an essentially flattened form having n magnetic circuits arranged in a manner to define an opening in which a rotor provided for instance with a permanent magnet may pivot. The magnetic circuits are generally magnetically decoupled from one another and each cooperates with the rotor through two magnetic stator poles placed in positions approximately diametrally opposed relative to the rotation axis of the rotor, such axis extending perpendicularly to the general plane of the stator. Motors of this type may be advantageously used as stepping motors in analog display watches.

BACKGROUND OF THE INVENTION

There is known from the Japanese patent application JP-61-10958 a two-phase symmetric stepping motor having two rotation senses which is formed of two single-phase stator parts superposed onto one another and with an angular shift of 90° relative to one another.

The two single phase stator parts are fastened to one another, but are located in different planes. They are magnetically insulated from one another while being each provided with an excitation winding. Furthermore, each stator part defines an opening for a permanent magnet rotor common to both of them, the openings being aligned on the axis of rotation of the latter.

In order to define a stable position of the rotor, the edge of each opening of such stator parts is provided with two positioning notches which are diametrally aligned along a direction separated by 45° relative to the principal direction of the magnetic flux passing through the rotor and generated by excitation of the corresponding winding. In the absence of excitation, the stable position of the rotor is attained when the North-South axis of the permanent magnet of the rotor is perpendicular to the alignment axis of the notches.

Thanks to this construction, the two stator parts work under exactly the same conditions with the rotor, however, because of their 90° shift each assures the rotation of the rotor in a sense which is individual to it. If one admits that the volume of the permanent magnet of the rotor traversed by each of the two magnetic fluxes is the same, the resulting motor couple is identical for both senses of rotation.

This known motor exhibits several disadvantages. Initially, the volume occupied by the permanent magnet of the rotor is only partially used since each magnetic circuit surrounds less than the half of this volume. This disadvantage is further aggravated by the fact that the magnetic circuits are necessarily spread apart from one another along the rotor axis in order to assure the magnetic insulation thereof. There results therefrom a comparatively substantial height which is above all inconvenient when the motor is employed in horological applications.

Another disadvantage resides in the fact that the openings of the magnetic circuits must be aligned with precision along the rotor axis which causes manufacturing difficulties so as to increase in an exaggerated manner the cost of the motor.

The invention has as its purpose to provide an electric motor of the type indicated hereinabove which does not exhibit these disadvantages.

SUMMARY OF THE INVENTION

It has thus as object an n-phased electromagnetic motor, n being greater than 1, with two having n magnetic circuits, such motor including:

a stator defining a stator cavity and 2n magnetic poles, each such pole comprising a polar expansion partially defining said stator cavity, a polar arm which extends from said polar expansion and a polar attachment lug serving as magnetic contact at the other end of said polar arm, said polar expansions being separated from one another by high magnetic reluctance zones forming necks, such stator comprising n magnetic shunts, each having two attachments lugs and magnetically coupling two non-adjacent magnetic poles to one another;

a rotor mounted in the stator cavity to rotate relative to said stator around an axis such rotor comprising a permanent magnet located in the stator cavity;

means mounted on each magnetic shunt for generating a magnetic flux in the poles with which they are associated, each of said shunts forming, with said two nonadjacent magnetic poles with which they are magnetically associated with the permanent magnet of the rotor, one of said magnetic circuits which is magnetically decoupled from the n minus one other magnetic circuits of the motor, this latter being characterized in that said magnetic poles of the stator are formed, respectively, by the branches of a single star-shaped piece such branches extending from said stator cavity, said polar expansions being situated in a single and common plane perpendicular to the rotation axis of said rotor.

Thanks to these characteristics, the motor of this invention exhibits no particular difficulty in manufacture or assembly. In addition, all the magnetic circuits of the motor take in the same volume of the rotor permanent magnet since all the polar expansions are substantially located in a single and common plane. It will be noted that this latter characteristic is obtained together with a magnetic decoupling of each magnetic circuit relative to the other magnetic circuits.

The invention will be better understood with the help of the description to follow and drawings which illustrate it solely by way of example.

DESCRIPTION OF THE PREFERRED EMBODIMENTS

In referring to FIGS. 1 and 2, there will be hereinafter described a first embodiment of a two-phased symmetric stepping motor having two rotation senses in accordance with the invention.

Such motor comprises a stator 1 and a rotor 2 rotatively mounted within said stator in a stator cavity 3 having an essentially circular form provided in such stator. The rotation axis X—X of rotor 2 is perpendicular to the general plane of stator 1. It is to be noted that in conformity with a construction known to specialists, the rotor may be mounted for rotation in bearings fixed in a mounting which is fastened to the stator, such elements not being shown.

Stator 1 comprises four magnetic poles 4a to 4d and two magnetic shunts 5a, 5b. Each of such magnetic poles ends up in a polar expansion 6a and respectively 6b, 6c and 6d which determine a portion of the edge of the stator cavity 3. These magnetic poles 4a to 4d are extended towards the exterior by polar arms 7a to 7d, each of which ends with a polar lug 8a to 8d serving as a fastening means and magnetic contact applied to a corresponding lug 9a to 9d. The lugs 9a and 9c belong to the magnetic shunt 5a and the lugs 9b and 9d belonging to the magnetic shunt 5b. Each of these shunts bears a winding 10a, 10b of which it forms the core and beyond which it extends by arms 11a to 11d respectively ending up by lugs 9a to 9d.

The lugs 8a to 8d and 9a to 9d are respectively coupled to one another by pins 12; other known means of attachment can be provided.

In order to magnetically insulate each stator pole from the neighbouring poles, the polar expansions 6a to 6d are magnetically decoupled from each other by means of necks 13a to 13d which form zones having high magnetic reluctance while maintaining the poles rigidly relative to one another.

It is thus established that the central part of the stator 1 defining the stator cavity 3 and including the polar arms 7a to 7d, the expansions 6a to 6d and the necks 13a to 13d forms a star-shaped piece in a single plane designated by the general reference 14. Such piece thus exhibits here four arms, each arm extending at 90° from its two neighbouring arms starting from the stator cavity 3, two of such arms, namely arm 7a and 7b, being elbowed at a right angle. The rotor 2 comprises a permanent magnet located in the stator cavity in the plane of the star-shaped piece.

This configuration associates two magnetic stator poles 4a and 4c diametrally opposed relative to the rotation axis X—X of said rotor 2 with a first magnetic circuit and the other two magnetic stator poles 4b and 4d with a second magnetic circuit.

In order to insulate magnetically such magnetic circuits from one another, there is provided an insulating gap 15 in the region 15R where said arms 7a and 11d intersect one another in superposition owing to the fact that the two magnetic circuits are both located in two neighbouring parallel planes. In the embodiment of FIG. 1, such gap 15 is obtained by providing a recess 16 in the elbowed arm 11d of shunt 5b and, in order to facilitate the construction of such motor, also in the elbowed arm 11c of shunt 5a. Such recess may be obtained by simple grinding. In this case the gap 15 is filled up by a surrounding non-magnetic fluid (see also FIG. 2).

Figure 1:
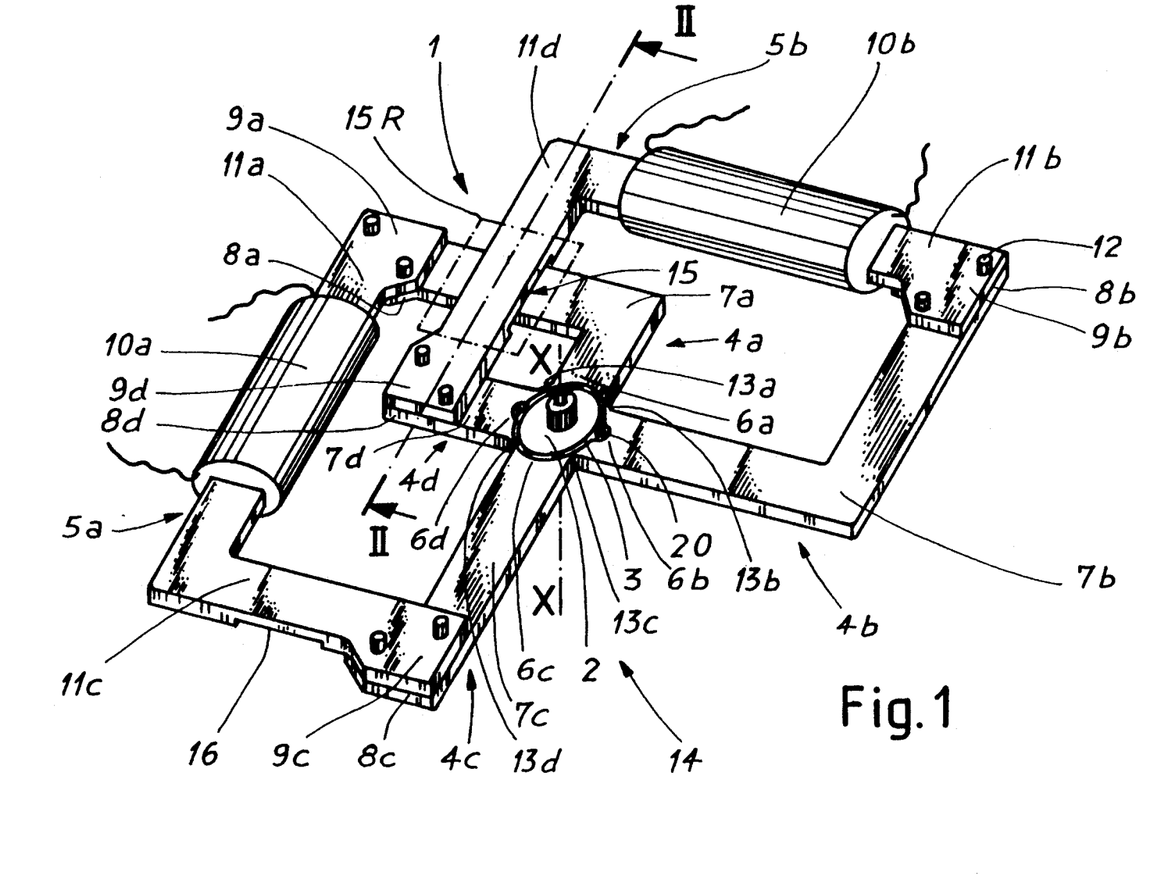
FIG. 1 shows schematically a two-phased stepping motor having two rotation senses according to the invention.
Figure 2:
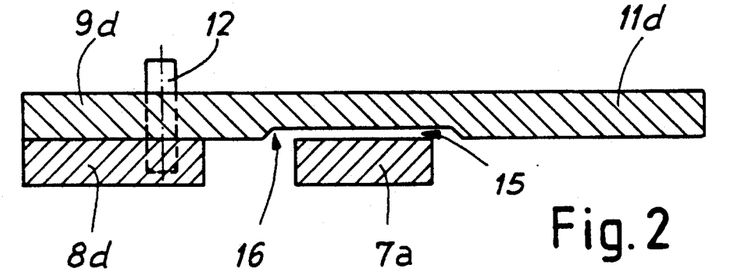
FIG. 2 is a cross-section on an enlarged scale according to line II—II of FIG. 1 showing schematically a first variant of the motor in order to obtain a magnetic insulation gap.
Figure 3:
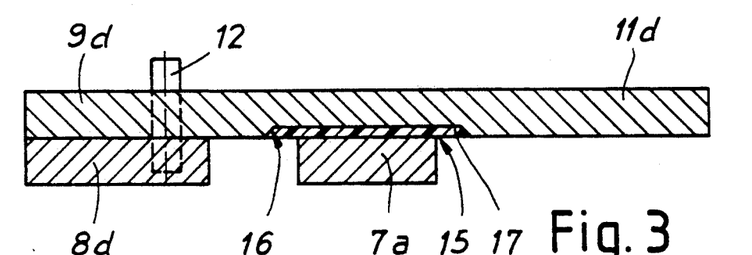
FIGS. 3 to 5 are cross-section views respectively of second, third and fourth possible variants of the motor according to the invention, in particular in view of obtaining a gap.
Figure 4:
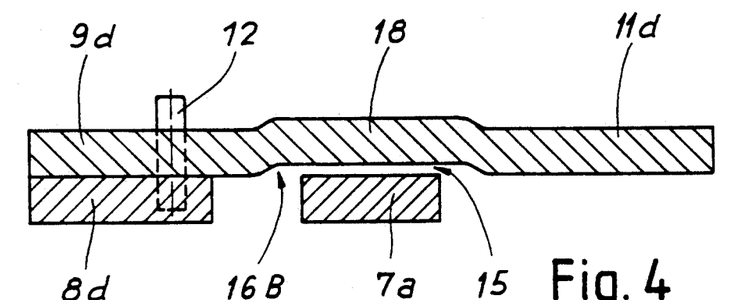
Figure 5:
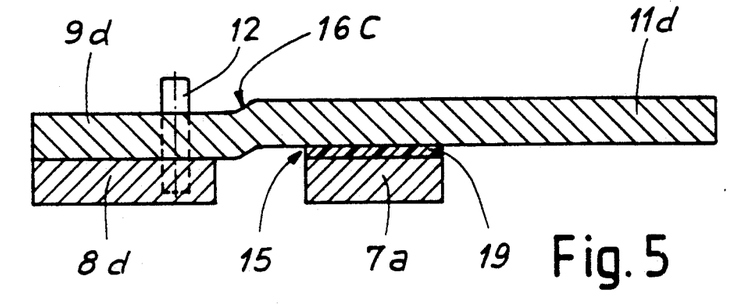

FIGS. 3 to 5 show three other variants in the formation of the gap arranged between the arm 7a of the star-shaped piece 14 and the arm 11d of the shunt 5b shown in FIG. 1.

On FIG. 3, shunt 5b also includes a recess 16. However, in this case such recess is filled with a nonmagnetic material 17, plastic material for example, acting as a spacer. Such arrangement enables one to obtain increased rigidity of the stator assembly, the shunt 5b no longer being cantilevered relative to its fastening onto pole 4d.

As shown on FIG. 4, gap 15 may also be provided between arm 7a and shunt 5b by deforming arm 11d of such shunt 5b by a swaging operation. The deformed part 18 of such arm gives rise to a recess 16b.

According to another variant represented on figure 5, shunt 5b exhibits in its connection zone to lug 9b a deformation 16c. An analogous deformation (not visible on the drawing) must then be provided in arm 11b of such same shunt 5b in order to bring its fastening lug 9b into the appropriate level. A spacer 19 of nonmagnetic material may be provided in this case between arm 7a and shunt 5b.

It is to be noted that other similar variants are not excluded, in particular variants in which the recesses 16 and 16b are provided, not in arm 11d of shunt 5b, but in a similar manner in arm 7a of the star-shaped piece 14.

As may be determined from FIG. 1, magnetic shunts 5a and 5b are advantageously identical from whence results a reduction in the cost of manufacture and a greater flexibility for assembly, each shunt bearing its winding being adapted to be employed equally for one or the other of the magnetic circuits.

If the application of the motor does not require a thickness as small as possible, as may be the case in horology, one may envisage a stator on three parallel planes. This embodiment of the motor according to the invention is partially shown on FIG. 6. In this case a star-shaped piece 14a is situated in the median plane, while shunts 5a-A and 5b-A are respectively situated on either side of such median plane in two parallel and adjacent planes. The shunt 5a-A then exhibits the general form of a U the arms 11a-A of which intersects in superposition the arm 11d-A of the other shunt 5b-A. Arm 11a-A is terminated by a lug 8a-A which is fixed to the corresponding lug 9a-A of the star-shaped piece 14a.

Figure 6:
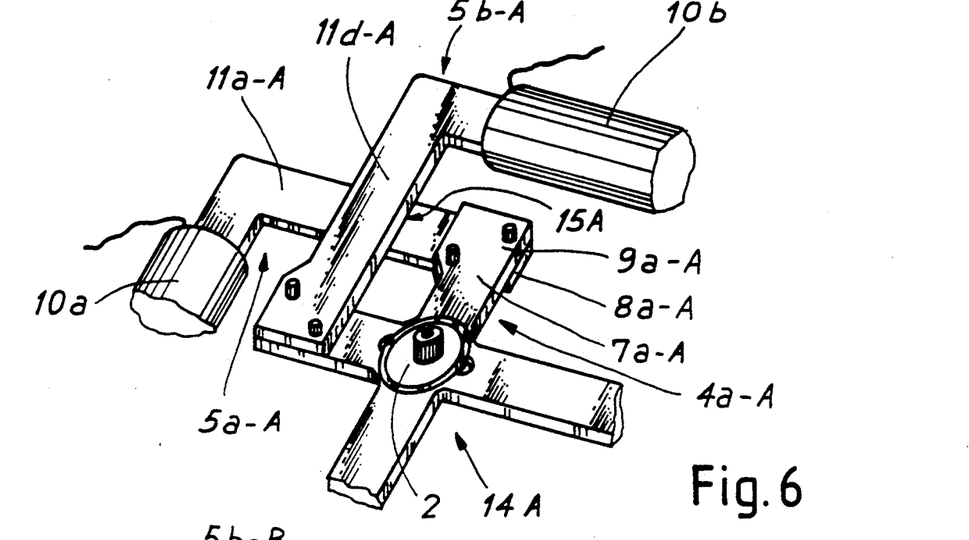
FIG. 6 shows a partial view of another embodiment of a two-phased motor with two rotation senses according to the invention.

The gap 15A then has a thickness substantially equal to the thickness of the star-shaped piece 14A.

Figure 7:
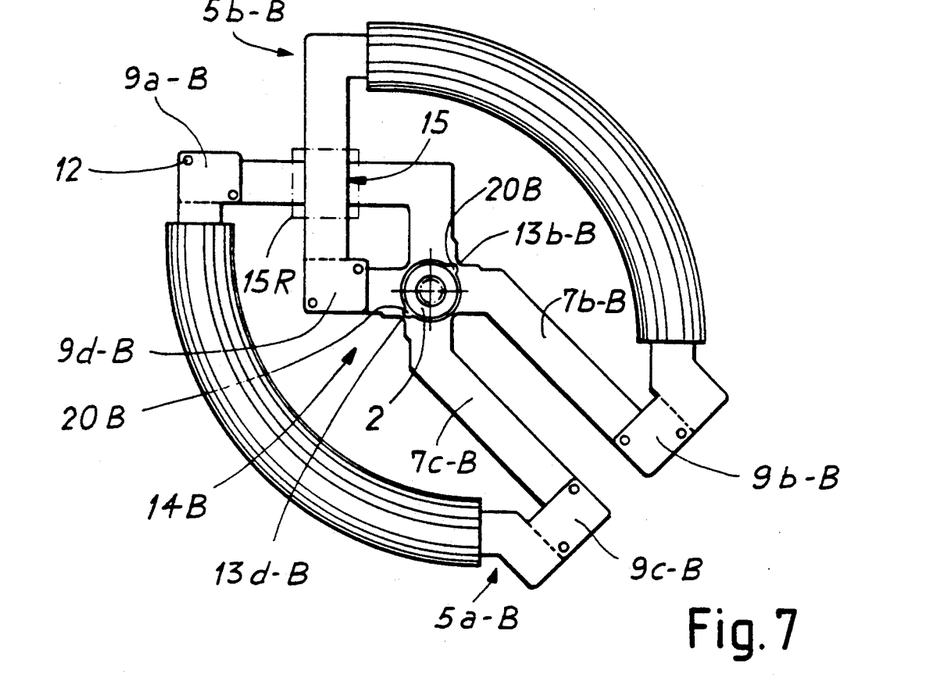
FIG. 7 shows another embodiment of a two-phased stepping motor with two rotation senses according to the invention.

FIG. 7 represents a variant of the embodiment of the invention shown in FIG. 1 enabling one to obtain a more compact assembly than that of FIG. 1 and in which there is provided a star-shaped piece 14B the arms 7b-B and 7c-B of which are bent back in a manner to extend parallel to one another starting from their respective polar expansions. The parts of shunts 5a-B and 5b-B forming the cores of the windings of the motor, are then inwardly curved in a manner to connect the attachment points formed by the corresponding lugs 9a-B to 9d-B of such shunts.

The motor according to the invention which has been previously described may function principally in two different manners, namely in a continuous mode or in a stepping mode.

There will now be examined the stepping mode of operation in referring to FIGS. 8 to 17, FIGS. 8 to 11 concerning the embodiment of FIG. 1 while figures 13 to 16 bear on that of FIG. 7. As seen in FIGS. 8 to 16 the permanent magnet of the rotor has only two magnetic poles diametrally opposed relative to the rotation axis X—X of the rotor.

In order to be able to operate in a stepping mode, it is necessary to provide the rotor with stable rest positions relative to the stator. This may be accomplished by providing two notches, either 20 or 20B in diametrally opposite positions in the edge of the stator cavity 3. (See FIG. 1 respectively). Under these conditions since the permanent magnet rotor exhibits a given direction of magnetization it will come to locate itself in a manner such that in the absence of excitation of windings 10a and 10b, such direction DR (rest direction) orients itself perpendicularly to the direction DE (notch direction) defined by notches 20 or 20B (see FIGS. 8 and 13).

It will be noted that in the case of FIGS. 1 and 8 to 11, notches 20 are aligned with the polar expansions 6b and 6d, while in the case of FIGS. 7 and 13 to 16, notches 20 coincide with two necks 13b-B and 13d-B which are diametrally opposed.

Figure 12:
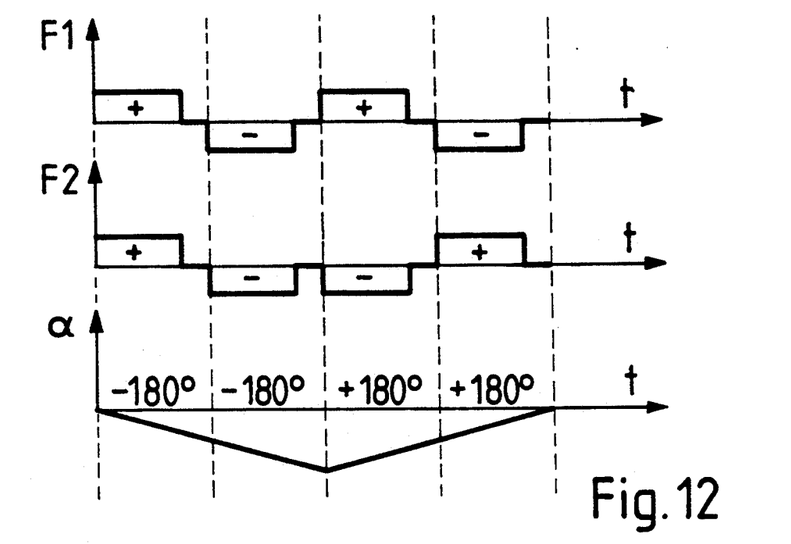
FIGS. 12 and 17 show schematically a manner according to which the windings must be energized in order to control the motor according to said first and respectively said second mode of operation.
Figure 13:
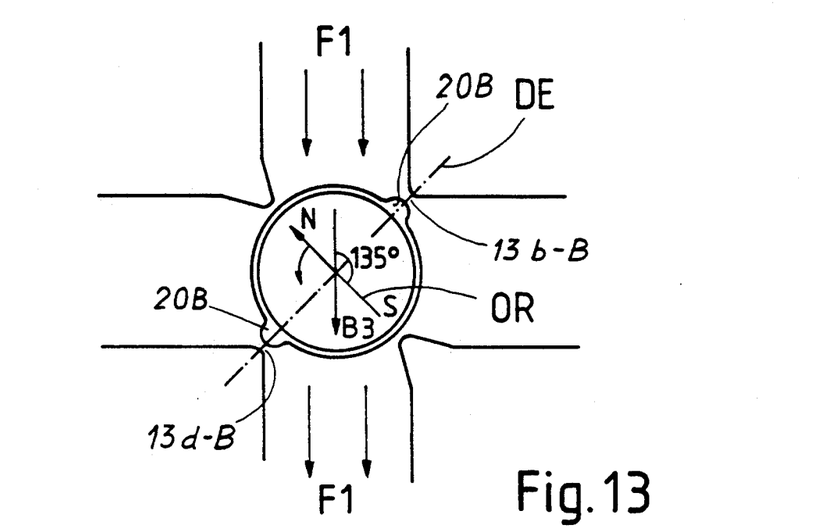
Figure 14:
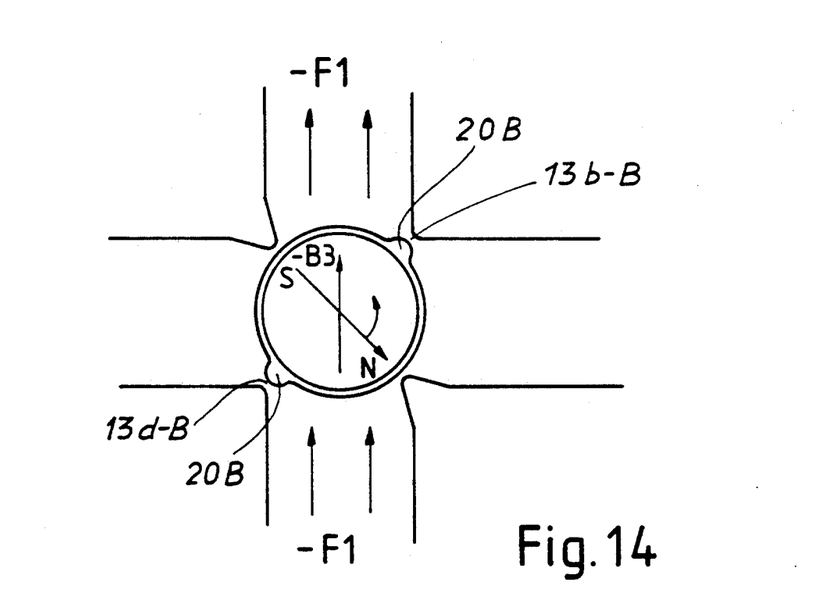
Figure 15:
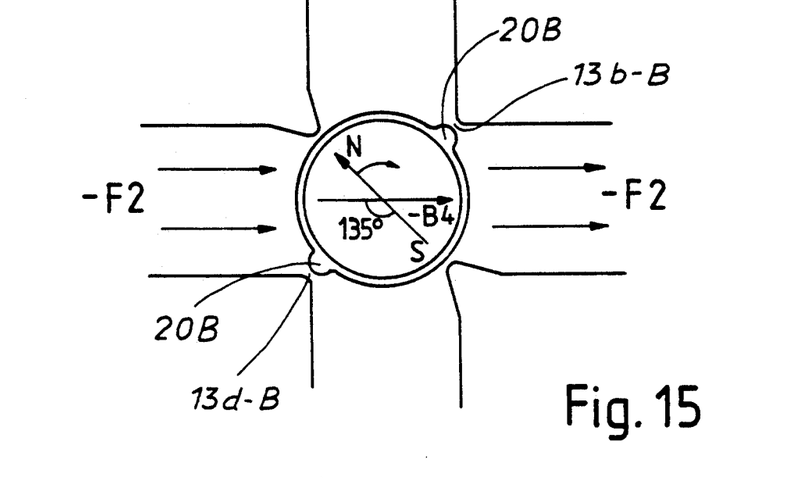
Figure 16:
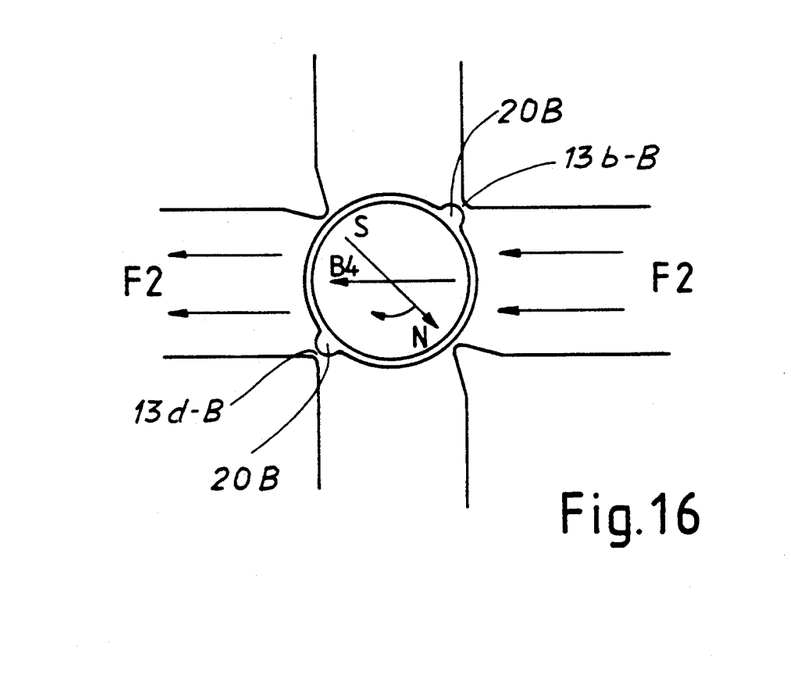

FIG. 12 shows schematically a method according to which windings 10a and 10b may be energized in order to control the motor of FIG. 1. One step of the motor corresponds to an angular displacement of 180° of the rotor around its axis X—X.

Figure 8:
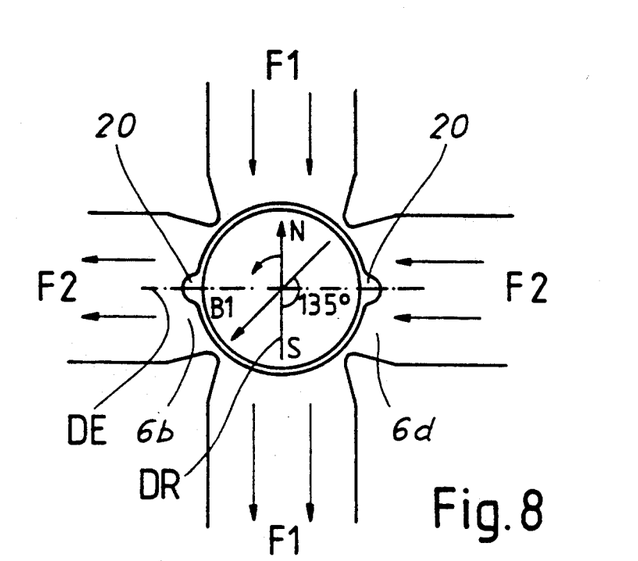
FIGS. 8 to 11 and 13 to 16 represent according to a first and respectively second method of operation, schematic views of the bipolar permanent magnet of the rotor in a rest position and the sense of rotation resulting from the interaction of said magnet with the magnetic flux generated in the stator which traverses such permanent magnet.
Figure 9:
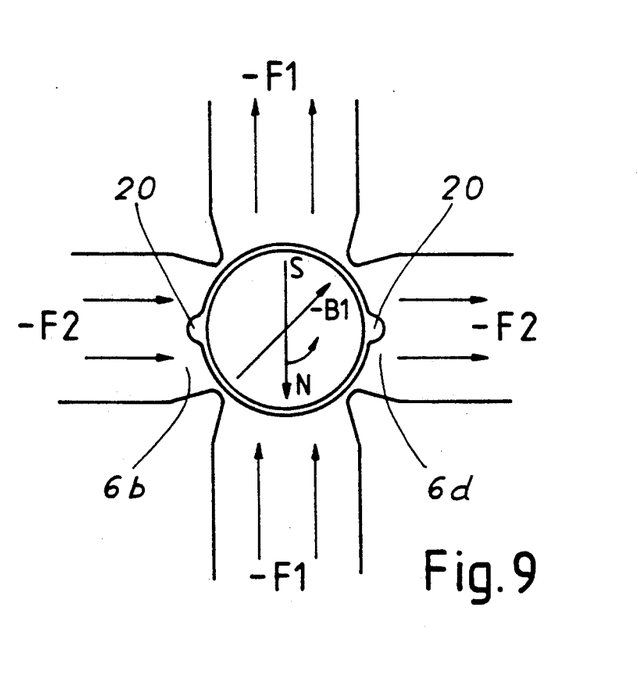
Figure 10:
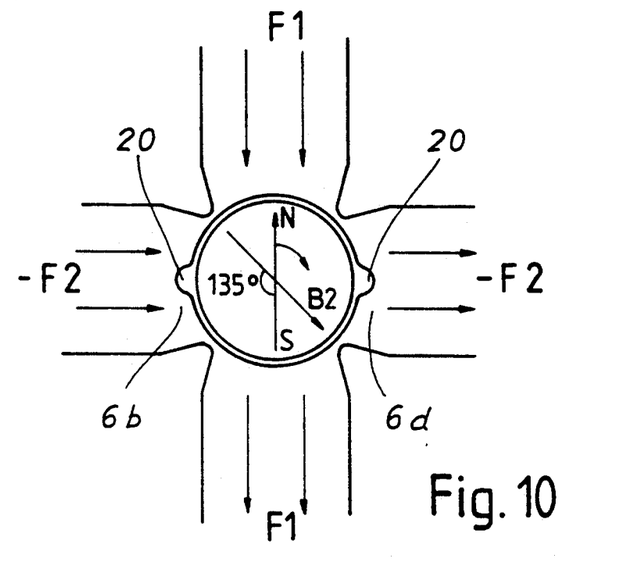
Figure 11:
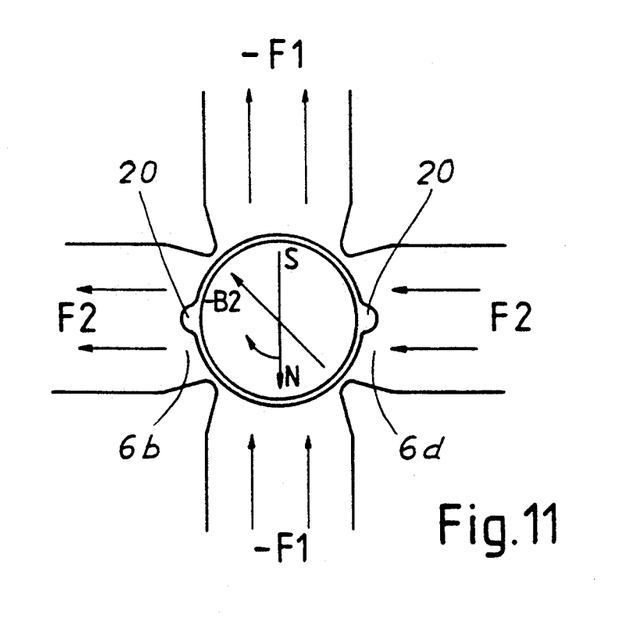

It is seen that this displacement takes place according to the counter clockwise (negative) sense (as seen on FIGS. 8 and 9) when the windings receive current pulses of the same polarity per step, the sense of the corresponding flux being indicated on FIGS. 8 and 9 by references ±F1 and ±F2 and the resulting magnetic fields in the permanent magnet of the rotor by references ±B1.

The displacement takes place in the clockwise positive sense when the pulses applied to windings 10a and 10b are respectively of opposite polarities (see FIGS. 10 and 11),the resulting magnetic fields being then ±B2.

Figure 17:
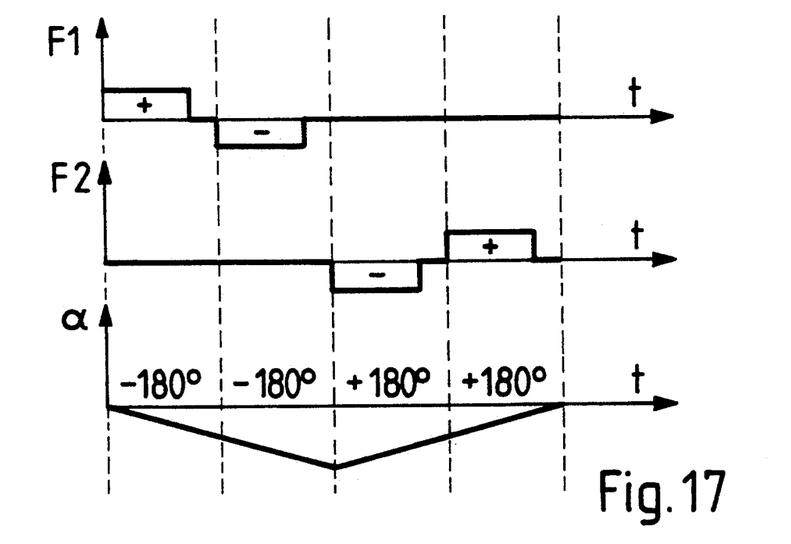

On the other hand, the motor windings of FIG. 7 must be controlled in conformity with the schematic shown on FIG. 17, the sense of the fluxes being here also shown by references ±F1 and ±F2 and the resulting magnetic fields in the permanent magnet of the rotor by ±B3 and ±B4 on FIGS. 13 to 16.

For the motor of FIG. 7, it is seen that in order to effect two steps in the same counter-clockwise sense, one applies successive control pulses of opposite polarities to winding 10a only; then, in order to make two steps in the clockwise sense, it is winding 10b which receives two successive pulses of opposite polarities.

The motors of FIG. 1 as well as of FIG. 7 have respectively central parts 14 and 14b for which each high reluctance neck is oriented at 90° to the two neighbouring necks.

Furthermore, the relative position of the positioning notches 20 and 20B relative to the polar expansions such as is shown in FIGS. 1 and 7 respectively, permit an operation of the motor which is rigorously identical whatever may be the rotation sense by means of a control with the help of current pulses, likewise identical disregarding their polarity. This leads also to identical performances for both senses of rotation. It is thus possible to control and to slave such motors in an optimum manner for both rotation senses in employing a single voltage level, this being very advantageous.

Figure 18:
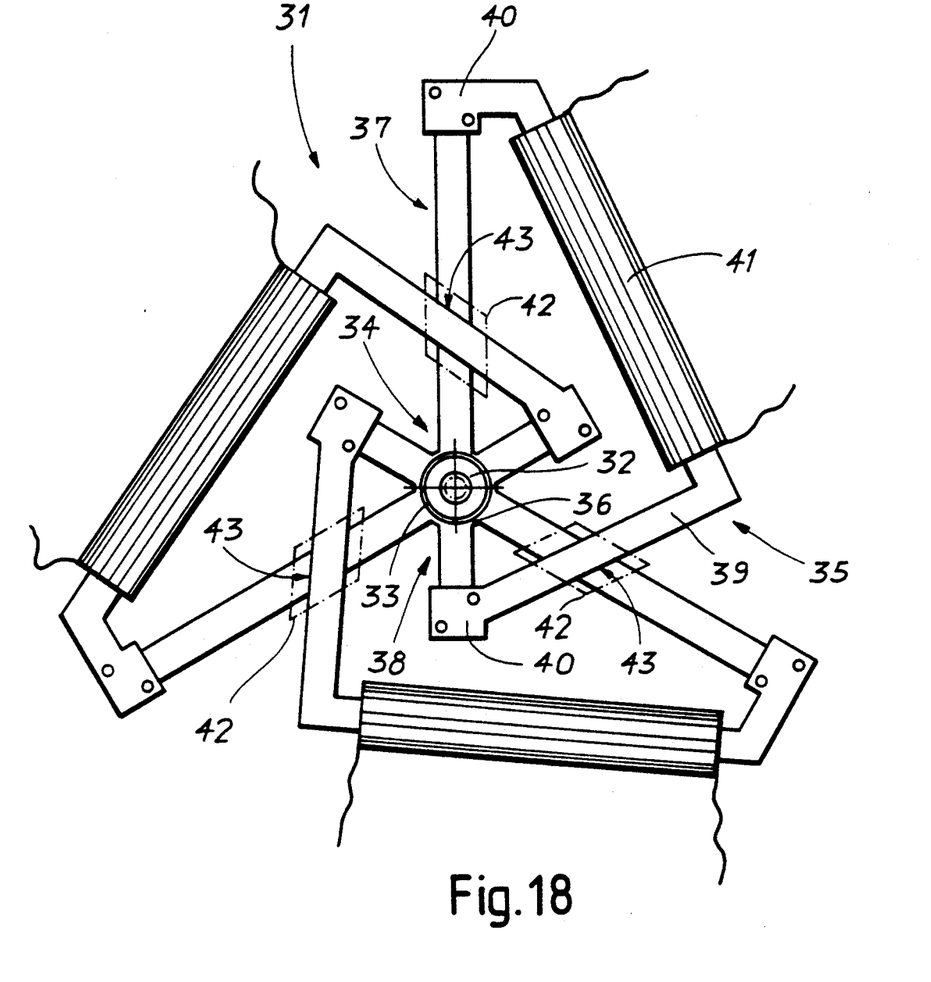
FIG. 18 represents schematically on the same scale as that of FIG. 1 a three-phase motor having two rotation senses according to a further embodiment of the invention.

FIG. 18 represents another embodiment of the invention which constitutes a three-phase motor.

Such motor comprises a stator 31 defining a stator cavity 33 in which is rotatively mounted a rotor 32 having a bipolar permanent magnet.

The stator comprises a single central star-shaped piece 34 in the center of which is provided the stator cavity 33.

For each phase of the motor, the stator comprises a magnetic circuit 35 magnetically decoupled from the other magnetic circuits by necks 36.

Each magnetic circuit comprises:
a long branch or pole arm 37 belonging to a pole of the star-shaped piece;
a short branch or pole arm 38 belonging to another pole of the latter situated in a diametrally opposite position;
a C-shaped magnetic shunt 39 fastened by lugs 40 to corresponding lugs (not visible on the drawing) provided at the free ends of the branches 37 and 38 of the star-shaped piece 34;
a winding 41 mounted on the magnetic shunt 39. Thus the motor comprises three magnetic circuits 35 having six pole arms 37, 38 as shown in FIG. 18.

In this motor, there are three regions of intersection in superposition 42 in which there is provided a gap 43 in order to magnetically insulate the magnetic circuits concerned. This gap may be obtained in a manner analogous to those shown respectively by FIGS. 2 to 5.

It will be noted that the magnetic circuits of this motor belonging respectively to its three phases are of identical construction, each circuit being shifted by 120° relative to the two adjacent circuits.

This three-phase motor is represented on FIG. 18 without a positioning notch; however, it is entirely possible to provide positioning notches appropriate to a stepping mode of operation. Just as for the two-phase motor considered previously, this motor may operate according to a continuous mode or according to a stepping mode.

What I claim is:

1. An electromagnetic motor of n phases, n being greater than 1, having n magnetic circuits, such motor including:
    a stator defining a stator cavity and including 2n magnetic poles, each such pole comprising a polar expansion partially defining said stator cavity, a polar arm which extends from said polar expansion and a polar attachment lug serving as a magnetic contact at an end of said polar arm, said polar expansions being separated from one another by high magnetic reluctance zones forming necks, the stator further including n magnetic shunts, each having two attachment lugs and each magnetically coupling a separate pair of non-adjacent ones of said magnetic poles to one another;

a rotor mounted in the stator cavity for rotation relative to said stator around a rotation axis said rotor comprising a permanent magnet located in the stator cavity;

means mounted on each magnetic shunt for generating a magnetic flux in the non-adjacent pair of magnetic poles with which they are magnetically associated; each of said shunts forming, with said non-adjacent pair of magnetic poles with which they are magnetically associated and with the permanent magnet of the rotor, one of said magnetic circuits which is magnetically decoupled from the n−1 other magnetic circuits of the motor, said magnetic poles of the stator being formed by a single star-shaped piece, with said polar arms extending from said stator cavity, said polar expansions all being situated in a single and common plane perpendicular to the rotation axis of said rotor.

2. A motor as set forth in claim 1 wherein said single star-shaped piece of the stator extends in a single and common plane.

3. A motor as set forth in claim 1 or in claim 2 wherein said stator is situated essentially on two adjacent parallel planes perpendicular to the rotation axis of said rotor, each magnetic circuit of the motor having at least one intersection in superposition respectively with at least one other of said magnetic circuits, each such intersection occurring between a portion of one magnetic shunt belonging to a first of said magnetic circuits and a polar arm belonging to a second of said magnetic circuits, said superposed portion of said shunt and said arm being separated by a gap for maintaining magnetic insulation between said first and second magnetic circuits.

4. A motor as set forth in claim 3 wherein a recess formed in said portion of said shunt of said first magnetic circuit defines said gap.

5. A motor as set forth in claim 3 wherein a recess in said polar arm of said second magnetic circuit defines said gap.

6. A motor as set forth in claim 3, having only two magnetic circuits, and wherein the two attachment lugs of said shunt of said first magnetic circuit are swaged in a manner to offset said portion of such shunt at a sufficient distance from said pole arm of said second magnetic circuit to define said gap.

7. A motor as set forth in claim 1 having only two magnetic circuits, the shunts belonging to said first and said second magnetic circuits are situated on either side of the single and common plane of said star-shaped piece respectively in two planes which are parallel to said single and common plane, the shunts of said first and second magnetic circuits having an intersection in superposition and being magnetically insulated from one another by means of a gap between said shunts at said intersection.

8. A motor as set forth in claim 1, such being a two-phase motor, and wherein the stator cavity is essentially circular, each of said necks forming with each of the two adjacent necks a central angle of substantially 90°.

9. A motor as set forth in claim 8 wherein said stator cavity defines an edge, two rotor positioning notches being provided on said edge in positions which are diametrally opposite relative to a center of said stator cavity.

10. A motor as set forth in claim 9 wherein the two rotor positioning notches are aligned along a direction defined by two opposing polar expansions.

11. A motor as set forth in claim 9 wherein the two rotor positioning notches are aligned along a direction defined by two opposing necks.

12. A motor as set forth in claim 1, having three magnetic circuits, and wherein said single star-shaped piece exhibits six pole arms, each of such pole arms being roughly angularly offset by 60° relative to the two pole arms adjacent thereto, each magnetic circuit having an intersection in superposition with each of the two other magnetic circuits, said magnetic circuits being separated from one another, at said intersections by a gap for maintaining magnetic insulation between such magnetic circuits.

13. A motor as set forth in claim 3 wherein the gap is filled in with a solid non-magnetic material.

14. A motor as set forth in claim 7 or in claim 12 wherein the gap is filled in with a solid non-magnetic material.

15. A motor as set forth in claim 1 wherein said magnetic shunts are identical to one another.

* * * * *